April 11, 1944.　　C. J. GRIFFITH　　2,346,424

RACK MECHANISM

Filed Jan. 2, 1943

INVENTOR:
CLIFFORD J. GRIFFITH
BY
ATTORNEY

Patented Apr. 11, 1944

2,346,424

UNITED STATES PATENT OFFICE 2,346,424

RACK MECHANISM

Clifford J. Griffith, Dimondale, Mich., assignor to Food Machinery Corporation, San Jose, Calif., a corporation of Delaware Application January 2, 1943, Serial No. 471,186

3 Claims. (Cl. 74—29)

My invention relates to mechanical powers and has for its principal object the provision of a novel and efficient rack mechanism.

The manner of accomplishing the foregoing object, as well as further objects and advantages, will be made manifest in the following description taken in connection with the accompanying drawing in which.

Figure 1:
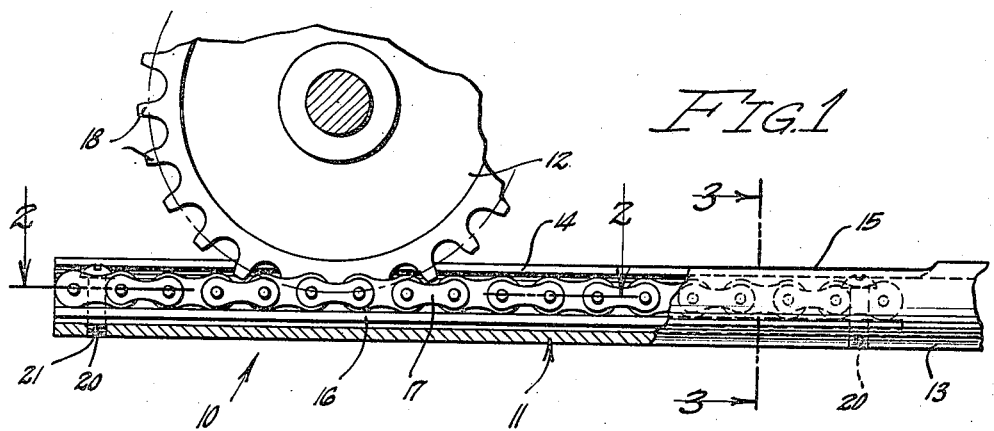
Fig. 1 is a diagrammatic view of the preferred embodiment of the rack mechanism of my invention, a portion thereof being broken away to illustrate the hidden structure thereof.
Figure 2:
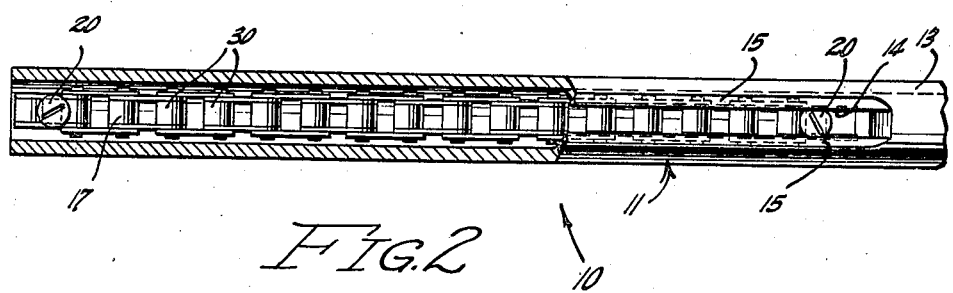
Fig. 2 is a sectional view taken on the line 2—2 of Fig. 1.
Figure 3:
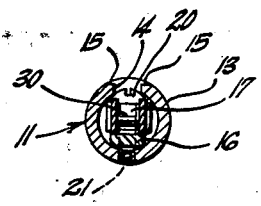
Fig. 3 is a cross sectional view taken on the line 3—3 of Fig. 1.

Referring specifically to the drawing, the rack mechanism 10 illustrated therein includes a rack 11 which is adapted to operate in mesh with a chain sprocket 12.

The rack 11 comprises a tube 13 having a longitudinal slot 14 formed therein, the surface of the tube adjacent said slot being milled off to form flat faces 15. The tube 13 is preferably provided with a flat metal strap 16, disposed therein opposite the slot 14, and with a section of roller chain 17 which is adapted to mesh with teeth 18 of the sprocket 12. The chain 17 practically fills the space within the tube 13, between the slot 14 and the metal strap 16. The strap 16 and section of chain 17 are united together, to maintain the chain section in taut condition, by screws 20 which pass downwardly through endmost links of the chain section 17, through suitable apertures provided in the metal strap 16, and are screwed into tapped holes 21 provided in the tube 13.

The rack 11 of my invention provides a highly efficient means of changing rectilinear motion into rotary motion or vice versa. The rollers 30 of the chain 17 develop relatively small friction with the teeth 18 of the sprocket 12, so that very small wear is produced on the sprocket or the rack by the operation of the rack mechanism 10. Furthermore, the edges of the slot 14 act as a guide for the rack 11, thus keeping this in proper alignment and meshing relation with the sprocket 12. The metal strap 16 backs up the chain 17, maintaining the rollers 30 always in proper meshing relation with the teeth 18 of the sprocket 12. The screws 20 are a simple inexpensive and effective means for uniting the chain with the tube 13.

While I have shown but a single embodiment of my invention, it is to be understood that various modifications may be made therein without departing from the spirit of the invention or the scope of the appended claims.

What I claim is:

1. In a rack mechanism the combination of: a sprocket; a tube having a slot formed longitudinally therein, said slot being adapted to receive said sprocket; a section of chain in said tube of the same pitch as said sprocket; means for securing said chain to said tube, so that when said sprocket extends into said slot and meshes with said chain, said chain and said tube together form a rack, the edges of said slot engaging said sprocket to maintain said sprocket in proper alignment with said chain.

2. In a rack mechanism the combination of: a tube having a longitudinal slot therein through which the teeth of a sprocket are adapted to extend; a flat member disposed in said tube opposite said slot; a section of chain disposed in said tube between said flat member and said slot; and means for securing said chain to said tube, said chain being adapted to mesh with the teeth of a sprocket properly toothed to match therewith and extending inwardly through said slot, the edges of said slot engaging said sprocket to maintain said sprocket in proper alignment with said chain.

3. In a rack mechanism the combination of: a tube having a relatively narrow longitudinal slot suitable for admitting into said tube the teeth of a sprocket operating in the plane of said slot; a section of chain disposed in said tube and adapted to have a meshing relation with said sprocket teeth; a flat strap disposed in said tube on the opposite side of said chain from said slot; and means for securing said chain, said strap and said tube together to form a rack, the edges of said slot engaging said sprocket to maintain said sprocket in proper alignment with said chain.

CLIFFORD J. GRIFFITH.